United States Patent [19]

Vergona

[11] Patent Number: 4,631,551
[45] Date of Patent: Dec. 23, 1986

[54] COLOR IMAGING APPARATUS USING ELECTRO-OPTIC MODULATORS

[75] Inventor: Albert B. Vergona, Rochester, N.Y.

[73] Assignee: Eastman Kodak Company, Rochester, N.Y.

[21] Appl. No.: 784,990

[22] Filed: Oct. 7, 1985

Related U.S. Application Data

[63] Continuation of Ser. No. 762,173, Aug. 5, 1985, abandoned.

[51] Int. Cl.$^4$ .................. G01D 9/42; G01D 15/14; H04N 1/21
[52] U.S. Cl. ................................. 346/108; 346/160; 358/296
[58] Field of Search ............... 346/107 R, 108, 160; 358/296

[56] References Cited

U.S. PATENT DOCUMENTS

| | | | |
|---|---|---|---|
| 3,508,051 | 4/1970 | Nichols | 346/108 |
| 3,850,506 | 11/1974 | Johnson et al. | 350/160 |
| 3,938,191 | 2/1976 | Jarmy | 346/108 |
| 3,938,878 | 2/1976 | Fox | 350/150 |
| 4,312,004 | 1/1982 | Samek et al. | 346/1.1 |
| 4,316,196 | 2/1982 | Jacobs | 346/1.1 |
| 4,370,029 | 1/1983 | Sprague et al. | 350/355 |
| 4,549,190 | 10/1985 | Ohara | 346/108 |

Primary Examiner—E. A. Goldberg
Assistant Examiner—Mark Reinhart
Attorney, Agent, or Firm—Raymond L. Owens

[57] ABSTRACT

Color imaging apparatus is disclosed for forming a beam of light having three separate intensity modulated color components. The beam is line scanned across the surface of a photosensitive surface for recording. Three separate color component light modulating channels are provided. Each channel includes an electro-optic modulator responsive to a voltage signal for modulating the intensity of collimated light passing through it in accordance with the desired intensity of a color component. Dichroic mirrors separate the light from each channel into an intensity modulated color component. These intensity modulated color components are combined into a single beam which is line scanned across the surface of the photosensitive member.

4 Claims, 4 Drawing Figures

COLOR IMAGING APPARATUS USING ELECTRO-OPTIC MODULATORS

This is a continuation of application Ser. No. 762,173 filed Aug. 5, 1985.

BACKGROUND OF THE INVENTION

1. Field of the Invention

The present invention relates to apparatus which have electro-optic modulators for forming color images on a photosensitive surface in response to electrical signals.

2. Description of the Prior Art

Electro-optic materials are those whose optical properties change in accordance with the strength of an electric field established within them. These materials make possible an electrically controlled "electro-optic modulator." In this disclosure, the term modulator includes a device which changes the intensity of light in response to an applied electric signal. An electro-optic modulator includes a member formed of an electro-optic material which receives plane polarized (linear) light and which changes the state of polarization of such light in response to an established electric field. An analyzer receives light from the member and blocks that light whose plane of polarization has not changed (no established electric field) while transmitting light when its plane of polarization has been changed by an established electric field. By changing the electric field in the electro-optic member, light which passes through the analyzer is modulated.

One example of an electro-optic material used in modulators is lanthanum-doped lead zirconate titanate (PLZT). Although PLZT is a preferred electro-optic material, it will be recognized by those skilled in the art that other electro-optic materials can also be used to change the polarization of light.

Without an electric field being established, some compositions of PLZT are optically isotropic, while others exhibit a static birefringence. In either case, when an electric field is applied through a member made of PLZT, the PLZT crystal structure changes. This change in crystal structure causes a change in birefringence. An optic axis is thereby formed which is aligned parallel to the electric field lines. The optic axis is a direction and not just one particular line. The applied voltage produces the electric field. The intensity of light which passes through a modulator is a function of the applied voltage. The intensity of the field causes the polarization of light to rotate.

U.S. Pat. No. 4,229,095 discloses several embodiments of electronic color-imaging apparatus that utilize arrays of separately-addressable, pixel (picture element) sized, electro-optic, modulators to effect multi-color exposure of panchromatic imaging media. Two preferred approaches are disclosed for providing different color light for exposure. In one approach, separate radiation sources, such as separate elongated flash lamps with respective red, green and blue filters are energized successively by a controllable power supply. In the other approach, a rotating member having successive red, green and blue filter sectors is interposed between a single illumination source and the modulator array.

These approaches which use electro-optic modulators are quite suitable for many imaging applications; however, they have some undesirable aspects. For example, in the multi-lamp approach, there are certain limits as to how fast these sources can be turned on and off and for higher speed imaging applications, this can create a problem. The rotating filter approach avoids certain difficulties; however, it involves precise syncronization of the filter movement and thus involves the costs of precise servo-systems as well as potential operational difficulties in higher speed applications.

In another approach set forth in U.S. Pat. No. 4,366,499, an array of electro-optic modulators is formed of an electro-optic material. Different color filter layers are provided on different ones of the modulators. This approach requires techniques for producing such filters and for aligning them with the modulators.

SUMMARY OF THE INVENTION

The object of this invention is to provide electronic color imaging apparatus which makes use of electro-optic modulators but which avoids the above-described problems.

This object is achieved by color imaging apparatus for forming a beam of light having three separate intensity modulated color components. The beam is line scanned across the surface of a photosensitive member for recording. The apparatus includes three separate color component light modulating channels, each including a source of light and an electro-optic modulator responsive to a voltage signal for modulating the intensity of light from the source passing through it in accordance with the desired intensity of a color component. The apparatus further includes means for separating light from each channel into an intensity modulated color component and for combining the components to form a single light beam and means for line scanning the light beam across the surface of the photosensitive member for recording.

An advantage of this invention is that it can employ inexpensive, panchromatic, incoherent light sources such as tungsten halogen lamps rather than lasers. Often laser light has wavelengths that do not match well with the spectral sensitivity of color film.

DETAILED DESCRIPTION OF THE PREFERRED EMBODIMENT

Figure 1:
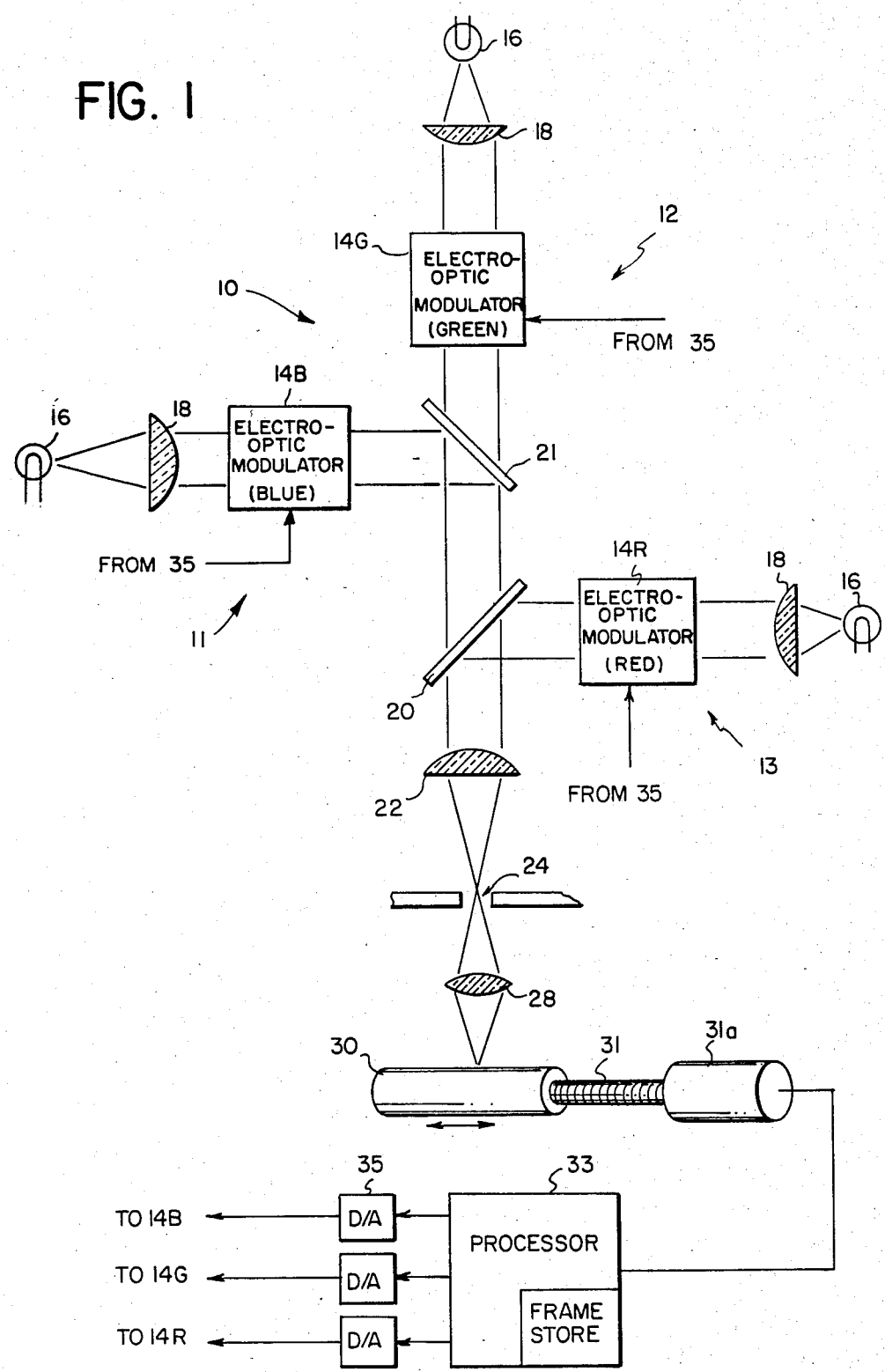
FIG. 1 is a schematic illustration of a color imaging apparatus in accordance with the present invention.
Figure 2:
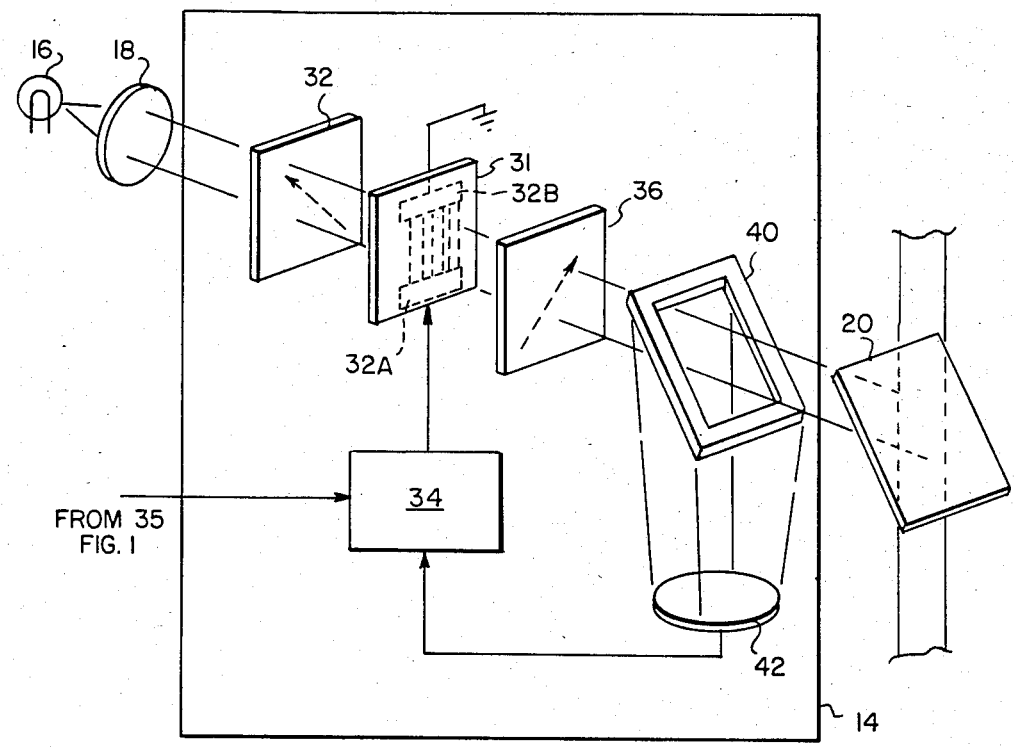
FIG. 2 shows in more detail a light channel of FIG. 1.
Figure 3:
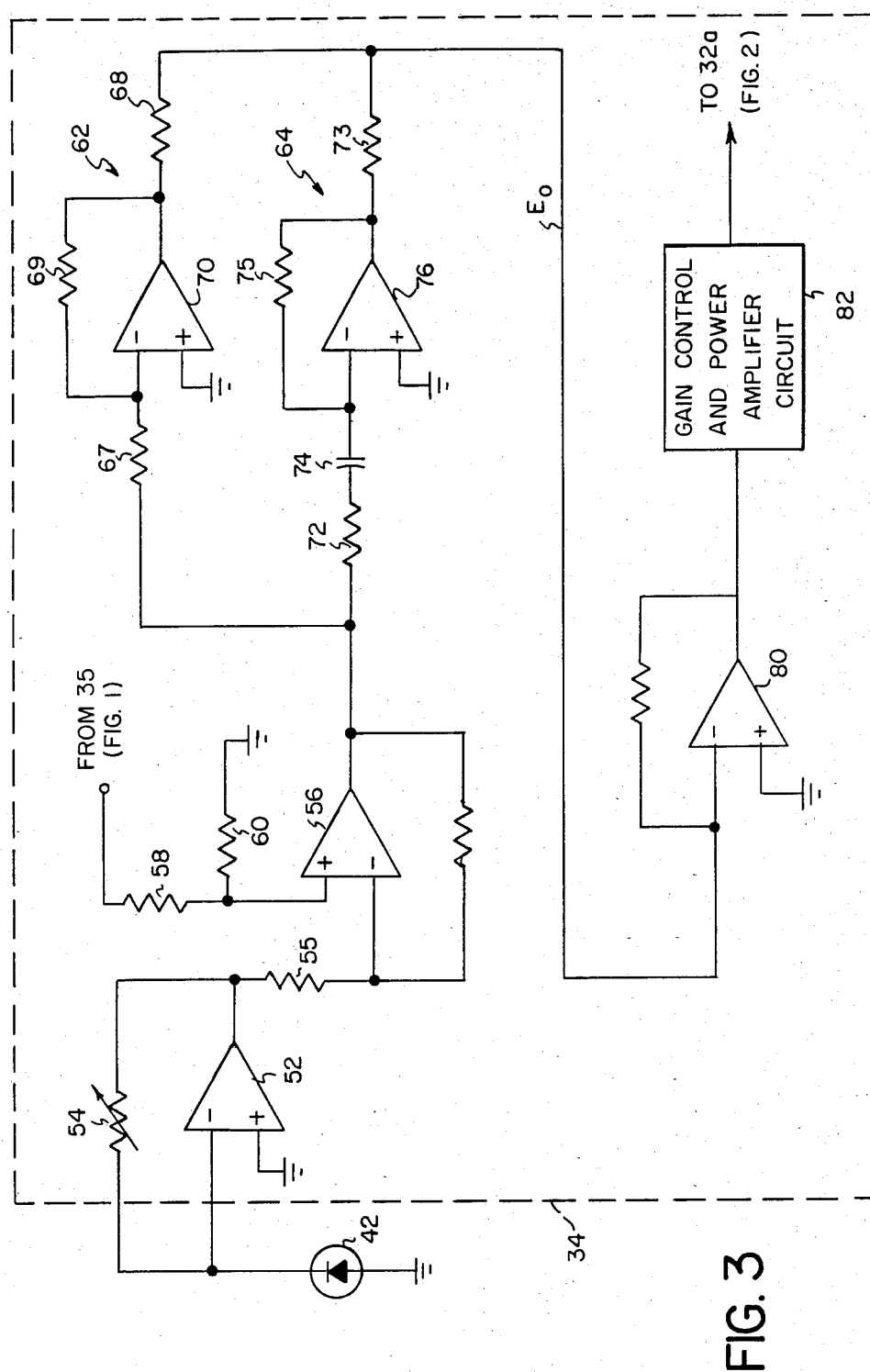
FIG. 3 shows in schematic form the feedback and control network for the light channel of FIG. 2.

FIG. 1 schematically illustrates one preferred embodiment which can accomplish color imaging in accordance with the present invention. The apparatus, denoted generally 10, comprises blue, green and red light channels 11, 12 and 13, respectively. Each light channel includes an electro-optic light modulator 14. The details of modulator 14, as well as a feedback arrangement, are shown in FIGS. 2 and 3, respectively. Each channel includes a panchromatic, incoherent light source 16. Such a source may be provided by a conventional Xenon arc lamp or a tungsten halogen lamp.

In each channel, light from the source 16 illuminates a collimator lens 18 which collimates the light and directs it to the modulator 14. The modulator 14 intensity modulates the light as a function of the amplitude of an analog input electrical signal. Modulated light from the blue channel 11 is incident upon a dichroic mirror 21. Mirror 21 separates the blue component from the incident light and changes the direction of this blue light component and directs it to a focusing lens 22. In a similar fashion, the red light component of the light from the channel 13 is directed by a mirror 20 to the lens 22. As shown, dichroic mirror 21 receives light from the channel 12. It passes the intensity modulated green light component and directs it to the mirror 20. The mirror 21 does not change the direction of this green light component and it is directed to the focusing lens 22. The lens 22 combines the red, green and blue, intensity modulated, light beam components and focuses them as a single beam at an aperture 24. Light passes through the aperture 24 and is collected by a lens 28. Lens 28 focuses this light beam as a spot on the surface of a photosensitive member disposed on a drum member 30. The photosensitive member will be understood to include both silver and non-silver color sensitive imaging layers.

The drum 30 is translated by a lead screw 31 which is driven by a stepper motor 31a. A microprocessor 33 controls the operation of stepper motor 31a. The microprocessor 33 will be understood to include a frame store memory that contains a color digital image. After the microprocessor provides signals to the motor 31a which translated the drum 30 to a new position, it provides color signals to digital to analog converters 35 which provide blue, green and red analog signals to their respective modulators 14. The light beam produced by the combined color components from each channel is line scanned across the surface of the photosensitive member on the drum 30. After a line has been completed, the drum 30 is rotated (by means not shown) to a position where a new line can be scanned.

Figure 4:
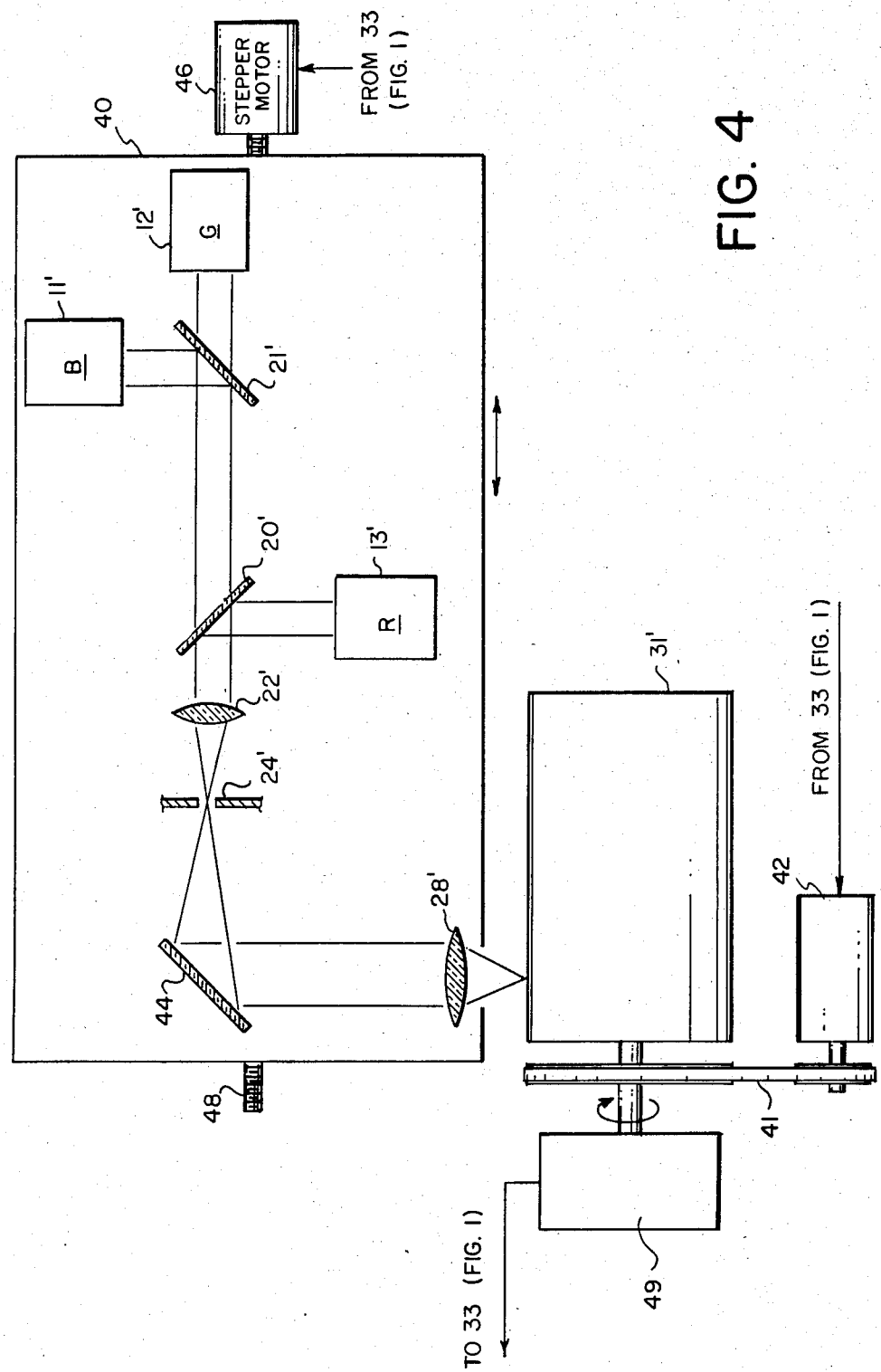
FIG. 4 is a schematic top plan view showing an alternative arrangement for performing line scane.

An alternative embodiment of this invention is shown in FIG. 4. The optics are mounted on a plate 40 which moves relative to a rotatable drum 31'. The drum 31' is driven by a belt and pulley arrangement 41 which, in turn, is driven by a drive motor 42 which is under the control of the microprocessor 33. (See FIG. 1.) Mounted on the plate 40 are the optics which are shown only schematically. More specifically, the optic's blue, green and red channels 11', 12', and 13' (each includes their own panchromatic, incoherent light source), dichroic mirrors 20' and 21', aperture 24', and lenses 22' and 28'. All these elements provide the identical functions as described above with reference to FIG. 1. A mirror 44 is shown to change the direction of the light which passes through the aperture 24. A stepper motor 46 receives control signals from the microprocessor 33 and rotates a lead screw 48. To achieve line scan, the plate 40 is mounted on the lead screw 48. The lead screw 48 translates the plate 40 and all its optics. An encoder 49 is mounted on the shaft of the drum 30' and provide drum positional control signals to the microprocessor 33 in a well known manner.

In operation, the microprocessor 33 provides control signals to the stepper motor 46 which incrementally translates the plate 40 to a new position relative to the drum 31'. At this position, a colored beam of light illuminates the surface of the photo- sensitive member on the drum 31'.

Turning now to FIG. 2, there is a more detailed view of an electro-optic modulator 14 which can be employed in the channels in the FIG. 1 and FIG. 4 embodiments. The modulator 14 includes an electro-optic member 31, an analyzer 32 and a polarizer 36. The arrow across the analyzer 32 indicates the direction of plane polarized light electric field (E-vector) transmitted by the analyzer 32. The electro-optic member 31 includes a substrate formed of an electro-optic material, preferably an optically isotropic PLZT which changes its birefringence in response to the establishment of an electric field in the substrate. Formed on the member 31 are two spaced electrodes 32a and 32b, respectively. The electrode 32a receives a voltage signal from the feedback and control network 34. It should be noted that the electrode 32b is connected to a fixed potential such as ground. The lines between these electrodes represent the electric field. The electrodes 32a and 32b can be built into the substrate or they can be deposited on the substrate by any of several means well-known in the art such as by vacuum deposition of metals and photolithography. While the electrodes may be formed of any suitable material, metals such as chrome-gold, titanium-gold and chrome-nickel-gold are particularly effective.

The electric field between the electrodes 32a and 32b is oriented generally perpendicular to the incoming collimated light and establishes an optic axis in the substrate in the same direction as the established electric field. The strength of the electric field controls the rotation of the plane of polarization of the incident light. The polarizer 36 has its optic axis arranged perpendicular to the optic axis of the analyzer 32. When the strength of the electric field established in the substrate of the member 31 causes the plane of polarization of incident light to rotate 90°, then a maximum intensity of light will pass through the polarizer 36. At lower intensities of established electric field, a lower intensity of light will pass through the polarizer 36. Of course, it is highly desirable that the electro-optic modulator 14 perform in a linear fashion as it modulates the intensity of light.

Problems exist with such PLZT modulators. Often, there is a loss of dynamic range after few minutes of operation. Changes in output light can change with a fixed voltage applied across the electrodes. Also a change in the light transmission is often dependent on whether the applied voltage was increasing or decreasing. This is known as a hysteresis effect. These non-linear effects are corrected in accordance with the invention by the network 34.

With reference to FIG. 1, light which passes through the polarizer 36 passes through an opening in a mirror member 40 and is directed onto dichroic mirror 20. A small sample of light is reflected off the mirror 40 and is directed down upon a photocell 42. Photocell 42 provides an input signal to the feedback and control network 34 representative of the beam intensity at the output of the modulator 14. The level of this input signal is compared with the level of the analog input signal as will now be described.

Turning now to FIG. 3, the photocell 42 is shown as a photodiode connected as an input to the inverting input of an operational amplifier 52. By adjusting the resistance of a resistor 54, the signal level at the output of the operational amplifier 52 can be adjusted. This output signal is applied by way of a resistor 55 to the inverting input of operational amplifier 56. The other input to operational amplifier 56 is one of the analog input signals from an digital/analog converter 35. The level of this analog signal is scaled by resistors 58 and 60 and represents the desired intensity of a color light component. The output of amplifier 56 is an error signal Eo'. This error signal Eo' can introduce oscillations in the adjustment of the voltage applied to the light modulator 14 since it can cause unacceptable transient responses such as overshooting and peaking. It is adjusted by two circuits.

These two circuits are: a proportional gain circuit 62 and a differentiator circuit 64. The output of network 60 is an error signal Eo which has been compensated to produce a desired transient response. This error signal is applied to the inverting input of operational amplifier 80. The output of amplifier 80 is applied to gain control and power amplifier circuit 82. Circuit 82 applies a voltage signal to electrode 32a of member 31. In response to the error signal Eo, circuit 82 adjusts the voltage signal such that the output light intensity is at the desired level indicated by the analog input signal.

Returning now to circuit 62, it is a proportional gain inverting amplifier circuit which includes input and output resistors 67 and 68, respectively, and a feedback resistor 69 for an operational amplifier 70. Circuit 64 is a differentiator circuit which reduces overshoots and includes input and output resistors 72 and 73, respectively, an input capacitor 74 and a feedback resistor 75 across an operational amplifier 76.

For a more complete discussion of networks which include proportional gain and differentiator circuits, see *Digital Control System Analysis and Design,* Phillips and Nagle (1984).

The invention has been described in detail with particular reference to certain preferred embodiments thereof, but it will be understood that variations and modifications can be effected within the spirit and scope of the invention.

I claim:

1. Color imaging apparatus for forming a beam of light having three separate intensity modulated color components and for line scanning such beam across the surface of a photosensitive member for image recording, comprising:
   (a) three separate color component light modulating channels, each including:
      (i) a panchromatic, incoherent light source;
      (ii) means for collimating light from the source;
      (iii) an electro-optic modulator responsive to a voltage signal for establishing an electric field which modulates the intensity of collimated light from the source passing through it in accordance with the desired intensity of a color component; and
      (iv) feedback means for sensing the intensity of light at the output of the modulator to produce an error signal which is a function of the difference in intensity of the color component from a desired level, said feedback means including means responsive to said error signal for adjusting the voltage signal applied to the electro-optic modulator to effect a change in the electric field and cause the light intensity at such output to be at the desired intensity;
   (b) means including two dichroic mirrors for separating light from each channel into an intensity modulated, color component;
   (c) means for combining the color components into a single beam and for focusing such beam on the surface of the photosensitive member; and
   (d) means for providing relative movement between the photosensitive member and the beam for line scanning the beam across the member's surface.

2. Color imaging apparatus as set forth in clam 1, wherein the source of light is a tungsten halogen lamp.

3. Color imaging apparatus as set forth in claim 1, wherein said photosensitive member is linearly movable to effect line scanning.

4. Color imaging apparatus for forming a beam of light having three separate intensity modulated color components which correspond to three analog electrical signals, respectively, and for line scanning such beam across the surface of a photosensitive member for image recording, comprising:
   (a) three separate color component light modulating channels, each including:
      (i) a panchromatic, incoherent light source;
      (ii) means for collimating light from the source;
      (iii) an electro-optical modulator responsive to a voltage signal for providing an electric field in the modulator to modulate the intensity of collimated light from the source passing through it in accordance with the desired intensity of a color component; and
      (iv) feedback means for sensing the intensity of light at the output of the modulator and an analog signal for producing an error signal, said feedback means including means responsive to said error signal for adjusting the voltage signal applied to the electro-optic modulator to change the electric field and cause the light intensity at such output to be at the desired intensity;
   (b) means including two dichroic mirrors for separating light from each channel into an intensity modulated, color component;
   (c) means for combining the color components into a single beam and for focusing such beam on the surface of the photosensitive member; and
   (d) means for providing relative movement between the photosensitive member and the beam for line scanning the beam across the member's surface.

* * * * *